United States Patent Office 2,992,092
Patented July 11, 1961

2,992,092
STIMULATING PLANT GROWTH
Harold W. Tompkins, Borger, and Bradford L. Archer, Phillips, Tex., assignors to Phillips Petroleum Company, a corporation of Delaware
No Drawing. Filed June 22, 1959, Ser. No. 821,643
7 Claims. (Cl. 71—2.7)

This invention relates to a method of stimulating plant growth by foliar application of a growth stimulant.

Although foliar application of stimulants to plants is a recognized method of plant feeding, it is generally considered impracticable except for occasional supplementary applications. We have discovered a method of stimulating plant growth by foliar application with a growth stimulant which gives surprisingly fast and gratifying results.

According to our invention growth of a plant can be stimulated by applying to the foliage thereof a solution of about 0.1 to 0.8 weight percent of a nitrate of a diloweralkyl sulfoxide in water.

It is an object of our invention to provide a method of stimulating the growth of plants. Another object of our invention is to provide a method of plant feeding by foliar application. Other objects, advantages and features of our invention will be apparent to those skilled in the art from the following discussion.

Diloweralkyl sulfoxides can be prepared by oxidizing the corresponding diloweralkyl sulfides with nitric acid. The sulfoxide carries with it an amount of nitric acid up to 1 mol depending upon the excess of nitric acid used in the synthesis. While ordinarily the nitric acid is removed by neutralization with caustic, sodium carbonate or potassium carbonate to recover the pure sulfoxide, we have found that the nitrated sulfoxide can be used in this form to stimulate plant growth by foliar application. The growth stimulant which we employ in our invention has the general formula

wherein each R is a loweralkyl radical. By loweralkyls in this specification and in the claims we refer to alkyl radicals having from 1 to 8 carbon atoms. Preferably each R is an alkyl radical having from 3 to 5 carbon atoms and the R groups can be alike or different.

Examples of compounds which can be used are nitrate of dimethyl sulfoxide, nitrate of dipropyl sulfoxide, nitrate of di-n-butyl sulfoxide, nitrate of di-n-amyl sulfoxide, nitrate of ethyl, propyl sulfoxide, nitrate of n-amyl, n-octyl sulfoxide, nitrate of diisooctyl sulfoxide, and the like.

The stimulants of our invention can be dissolved in water and are applied to the plants in solution form. The concentration of stimulant to be used varies within relatively narrow limits and should be at least 0.1 weight percent of the compound in water and not over about 0.8 weight percent as the over-application of a plant stimulant may have detrimental effects. We prefer to use an aqueous solution containing about 0.1 to 0.5 weight percent of the nitrated diloweralkyl sulfoxide.

The process of our invention and the advantages thereof are demonstrated by the following examples which are presented as being typical and should not be construed to limit the invention unduly.

Example I

Nitrated di-n-butyl sulfoxide in a concentration of 0.25 weight percent in 9 gallons of water was sprayed during a summer month on the following plants: Green Pfitzer, two elms, *Juniper scopolorum*, *Euonymous japonica*, *Juniper procumbens*, Blue Pfitzer, and Photinia. The sulfoxide solution was applied in the form of a fine mist with which the foliage of the plants was drenched. Fifteen days after the application all of the sprayed plants exhibited an abundance of new growth which was not evident on plants of the same species in the same planting to which the application of the sulfoxide had not been made. The treated plants had a more polished appearance than the controls and especially noticeable was the growth made by the Photinia, the *Juniper procumbens* and the Green Pfitzer. The Photinia planting showed several sproutings of new growth approximately 4–6 inches in length. The *Juniper procumbens* and the Green Pfitzer were covered with an abundance of new growth of about 1 inch in length.

Growth in the junipers appears to last about 4 to 6 weeks; however, the Euonymous and Photinia have a longer growth period. It is recommended that our stimulant be applied between about April 15 to May 15. As shown in the above example, however, excellent results can be obtained by applying our stimulant any time during the growing season.

Example II

In August approximately 100 hybrid tea roses in the same planting were sprayed with a 0.25 weight percent solution of nitrated di-n-butyl sulfoxide in water. All of the roses thus sprayed were startled into furious growth and the flowers were of excellent quality. Roses in the same type soil on either side of the sprayed roses, however, to which the application of the sulfoxide was not made grew and flowered poorly.

It is evident from the above examples that our invention has considerable utility in the nourishment of plants and especially can be used to give plants a vigorous, polished appearance in a relatively short time. Roses so treated become very floriferous. Leaves become much greener and the plants are thrown into a clean, healthy growth state. Evergreens, both broadleaf and conifers, roses, zinnias, snapdragons, violets, gold flame honeysuckle and even irises are stimulated into furious growth by a single application of the nitrated sulfoxides.

As will be evident to those skilled in the art, various modifications of this invention can be made, or followed, in the light of the foregoing disclosure and discussion, without departing from the spirit or scope thereof.

We claim:
1. A method of stimulating plant growth which comprises applying to the foliage of a plant a solution of about 0.1 to 0.8 weight percent of a nitrated diloweralkyl sulfoxide in water.
2. A method of stimulating plant growth which comprises applying to the foliage of a plant an aqueous solu- tion containing from about 0.1 to 0.8 weight percent of a compound having the formula

wherein each R is an alkyl radical having from 3 to 5 carbon atoms.

3. The method of claim 2 wherein said compound is nitrated di-n-butyl sulfoxide.
4. The method of claim 2 wherein said compound is nitrated dipropyl sulfoxide.
5. The method of claim 2 wherein said compound is nitrated di-n-amyl sulfoxide.

6. A method of stimulating plant growth which comprises applying to the foliage of a plant an aqueous solution of 0.1 to 0.5 weight percent nitrated di-n-butyl sulfoxide.
7. The method of claim 6 wherein said foliage is drenched by spraying with a fine mist of said solution.

References Cited in the file of this patent

UNITED STATES PATENTS 2,654,667    Goodhue et al. _____ Oct. 6, 1953